United States Patent [19]

Schmidt et al.

[11] 3,909,366

[45] Sept. 30, 1975

[54] PURIFICATION OF PROPYLENE OXIDE BY DISTILLATION

[75] Inventors: John P. Schmidt, New York, N.Y.; Alfredo Garcia, Jr., Cambridge, Mass.

[73] Assignee: Halcon International, Inc., New York, N.Y.

[22] Filed: June 28, 1972

[21] Appl. No.: 266,962

Related U.S. Application Data

[63] Continuation-in-part of Ser. No. 665,992, Sept. 7, 1967, which is a continuation-in-part of Ser. No. 586,035, Oct. 12, 1966, abandoned.

[52] U.S. Cl. ............................... 203/69; 260/348 R
[51] Int. Cl.$^2$ .................... B01D 3/34; C07D 301/02
[58] Field of Search .......................... 203/69, 68, 70; 260/348.5 L

[56] References Cited
UNITED STATES PATENTS

| | | | |
|---|---|---|---|
| 3,337,425 | 8/1967 | Binning et al. | 203/69 |
| 3,350,422 | 10/1967 | Kollar | 260/348.5 |
| 3,391,063 | 7/1968 | Sennewald et al. | 203/69 |
| 3,464,897 | 9/1969 | Jubin | 203/70 |
| 3,632,482 | 1/1972 | Hoory et al. | 203/69 |

*Primary Examiner*—Norman Yudkoff
*Assistant Examiner*—D. Sanders
*Attorney, Agent, or Firm*—William C. Long; David Dick; Riggs T. Stewart

[57] ABSTRACT

Propylene oxide is purified with respect to contaminating paraffinic and olefinic hydrocarbons by extractive distillation in the presence of an aromatic hydrocarbon having from 6 to 12 carbon atoms in the molecule.

14 Claims, No Drawings

PURIFICATION OF PROPYLENE OXIDE BY DISTILLATION

CROSS-REFERENCE TO RELATED APPLICATION

This is a continuation-in-part of co-pending application Ser. No. 665,992, filed Sept. 7, 1967, which in turn is a continuation-in-part of application Ser. No. 586,035, filed Oct. 12, 1966 and now abandoned.

This invention relates to the purification of propylene oxide to free it from difficulty-separable hydrocarbon contaminants, especially paraffinic and olefinic hydrocarbons formed as by-products in the preparation of propylene oxide.

Propylene oxide is conventionally produced by the epoxidation of propylene or by the dehydrohalogenation of propylene halohydrin, for example by the reaction between propylene and oxidizing agents such as peroxides, peracids or hydroperoxides, and by the reaction between propylene chlorohydrin and calcium hydroxide. Particularly efficient processes are based upon the epoxidation of propylene by means of hydroperoxides as disclosed in Kollar U.S. Pat. No. 3,350,422 of Oct. 31, 1967 and Kollar U.S. Pat. No. 3,351,635 of Nov. 7, 1967.

Such processes for the production of propylene oxide involve, however, the concurrent formation of small amounts of by-products which are extremely difficult to separate from the product propylene oxide, yet their separation is necessary from the standpoint of commercial requirements. These difficulty-removable impurities are paraffinic and olefinic hydrocarbons and are believed to be propylene derivatives having from 5 to 7 carbon atoms per molecule, primarily derivatives having 6 carbon atoms per molecule. The $C_6$ compounds include methyl pentenes and methyl pentanes. These materials have boiling points sufficiently close to that of propylene oxide (about 35°C. at 760 mm. Hg) that they are not effectively separated from propylene oxide by direct fractionation. In some cases an azeotrope is formed, making separation even more difficult.

It is, therefore, an object of the present invention to provide a method for separating propylene oxide from contaminating hydrocarbons, such as propylene derivatives formed in the preparation of propylene oxide.

Another object of the invention is to provide a method for separating propylene oxide from $C_6$ hydrocarbons and the like.

A further object is to provide an improved method for purifying propylene oxide.

These and other objects of the present invention will become apparent from the following description.

In our co-pending application Ser. No. 665,992 filed Sept. 7, 1967, and in its parent application Ser. No. 586,035 there is shown the purification of propylene oxide with respect to various contaminating hydrocarbons by extractive distillation with certain paraffins, naphthenes and olefins. Jubin U.S. Pat. No. 3,464,897 shows propylene oxide purification by means of extractive distillation with open chain or cyclic paraffins of 8 to 12 carbon atoms.

It has now been found that propylene oxide can be separated from contaminating paraffinic and olefinic hydrocarbons by extractively distilling the propylene oxide with a mono-cyclic aromatic hydrocarbon which has from 6 to 12 carbon atoms per molecule and which has a melting point below 50°C. This aromatic hydrocarbon preferably contains from 7 to 10 carbon atoms, and most preferably, from 7 to 8 carbon atoms.

It has been discovered that the presence of an aromatic hydrocarbon of the character indicated in the distillation column acts to increase the volatility of propylene oxide in relation to the volatilities of the contaminating hydrocarbons, or expressed another way, to lower the volatilities of the contaminating hydrocarbons in relation to the volatility of propylene oxide. As a result of this change in relative volatility, it is possible to recover essentially all of the propylene oxide fed to the column as an overhead stream containing negligible amounts of contaminating hydrocarbons, and essentially all of the contaminating hydrocarbons in the propylene oxide feed stream can be removed in the column bottoms stream along with the solvent hydrocarbon. This bottoms stream may be further processed, e.g. by stripping, to separate the contaminating hydrocarbons from the solvent hydrocarbon and the recovered solvent hydrocarbon can be recycled to the distillation column. British Pat. No. 1,059,669, Belgian Pat. No. 680,816, and U.S. Pat. No. 3,337,425 disclose the distillation of propylene oxide in the presence of certain aromatic hydrocarbons but in the processes of these patents the distillation is carried out to separate oxygenated impurities such as methyl formate and a distillation system is employed in which the propylene oxide remains in the still as a bottoms product in admixture with the added aromatic hydrocarbon. In the process of the present invention, on the other hand, the propylene oxide is purified with respect to contaminating hydrocarbons and the distillation takes place in a system in which, as indicated above, the propylene is removed as a purified overhead product.

Typical examples of specific aromatic hydrocarbons which are suitably used in accordance with this invention are benzene, toluene, ethylbenzene, o-xylene, m-xylene, p-xylene, cumene, pseudocumene, mesitylene, p-ethyltoluene, n-propylbenzene, n-butylbenzene, t-butylbenzene, p-cymene, 1,3,5-triethylbenzene, 1,2,3,4-tetramethylbenzene, 1,2,3,5-tetramethylbenzene, n-amylbenzene, 1,3-diethylbenzene, 1,4-diisopropylbenzene, and 3,5-diethyltoluene. Preferred aromatic hydrocarbons are toluene and ethylbenzene, and especially preferred is ethylbenzene.

The separation of propylene oxide from difficulty-removable paraffinic and olefinic hydrocarbons, e.g. $C_6$ hydrocarbons, is suitably accomplished in accordance with the invention by extractively distilling the impure propylene oxide with at least one part by weight of the aromatic hydrocarbon per three parts of propylene oxide fed to the fractional distillation column. In a typical case, the impure propylene oxide is fed to an intermediate point of the column, e.g. in its lower half, and the aromatic hydrocarbon is fed as a separate stream at a higher point, e.g. near the top of the column. Preferably, the amount of aromatic hydrocarbon is from about one part by weight to about 20 parts by weight per part of propylene oxide. Ordinarily, the greater the amount of aromatic hydrocarbon added to the impure propylene oxide, the greater is the change in relative volatility between propylene oxide and the contaminating hydrocarbons and the greater is the ease of separation by distillation. It is particularly preferred, therefore, to supply sufficient aromatic hydrocarbon that during extractive distillation the relative volatility of the contaminating hydrocarbons, relative to propylene oxide, will be below about 0.8, and more preferably at most about 0.6. The change in relative volatility effected by any amount of aromatic hydrocarbon upon a given impure propylene oxide can be readily determined by distillation in an Othmer equilibrium still of conventional type. Pressure is not a parameter of the invention and the extractive distillation may take place at atmospheric pressure, at superatmospheric pressure, or at reduced pressure. Generally, pressures in the range of from about 3 psia to about 100 psia are preferred.

A particular feature of the invention is that it permits integration with a commercial propylene epoxidation process without introducing an extraneous material into the system. For example, in accordance with a propylene epoxidation process of the type disclosed in the above-mentioned Kollar U.S. Pat. No. 3,350,422, propylene is preferably reacted with aromatic hydrocarbon hydroperoxides, especially ethylbenzene hydroperoxide. The hydroperoxide is readily produced by oxidation of the corresponding aromatic hydrocarbon, e.g. ethylbenzene, as disclosed in the Kollar patent, and during the epoxidation reaction there is a substantially quantitative conversion of the hydroperoxide to the corresponding alcohol. This by-product alcohol can then be reconverted to the hydrocarbon, e.g. ethylbenzene, by known procedures. Consequently, the aromatic hydrocarbon is a continuously present component of the system and is readily available for use in the purification process of the present invention, which is thus operable with a solvent which is indigenous to the system, and the introduction of an additional component to act as solvent in the extractive distillation is not necessary. While this possibility of an integrated system utilizing an aromatic hydrocarbon is a particular advantage of this invention, it will be apparent that any of the normally-liquid aromatic hydrocarbons having from 6 to 12 carbon atoms may be employed in the extractive distillation process of the invention to eliminate contaminating hydrocarbons from propylene oxide produced in any process which results in the co-production of such hydrocarbon contaminants, the invention is not limited to the use of any particular aromatic hydrocarbon solvent with any particular propylene oxide producing process. It will be apparent from what has been said above, however, that it is preferred to take advantage of the possibility which is provided by this invention of using the same aromatic hydrocarbon in the propylene oxide purification step that is used in connection with the propylene epoxidation operation.

The following Examples will serve to illustrate the present invention without, however, being limitative thereof.

EXAMPLE I

Ethylbenzene hydroperoxide is reacted with an excess of propylene in the presence of a soluble molybdenum catalyst. The reactor effluent is flashed to remove unreacted propylene and then fractionated to produce an overhead stream of crude propylene oxide and a bottoms stream comprising mainly alpha-phenylethanol, along with some catalyst and other reaction products. The crude propylene oxide stream is analyzed by gas chromatography, and the analysis shows significant amounts of contaminating $C_5$ to $C_7$ hydrocarbons, especially $C_6$ hydrocarbons such as 2-methyl pentane and olefins including 2-methylpentene-1 and 2-methylpentene-2, the total concentration of such contaminating hydrocarbons being less than one weight percent.

In order to demonstrate the effect of aromatic hydrocarbons in reducing the relative volatilities of hydrocarbon impurities of the type found in crude propylene oxide produced, for example, in the manner just described, a sample is prepared which is representative of the crude propylene oxide and contains the indicated $C_6$ impurities and this sample is processed in an Othmer recirculation equilibrium still at atmospheric pressure to measure the volatilities of the impurities relative to the volatility of propylene oxide. A corresponding sample of propylene oxide containing the same amounts of the two methyl pentenes is mixed with 7.1 parts of toluene per part by weight of crude propylene oxide processed similarly in an Othmer still, and the relative volatilities are measured. Another corresponding sample of propylene oxide containing the same amounts of 2-methyl pentane and 2-methylpentene-2 is mixed with 5.5 parts of ethylbenzene part by weight of crude propylene oxide and treated in similar fashion. Table I shows the effect of the added aromatic hydrocarbons on the volatilities of the several impurities in crude propylene oxide. All volatilities are relative to propylene oxide.

TABLE I

| Aromatic Hydrocarbon | None | Toluene | Ethylbenzene |
|---|---|---|---|
| weight part aromatic hydrocarbon per part crude propylene oxide | — | 7.1 | 5.5 |
| Vapor temp., °C. | 35.5 | 84 | 70 |
| Relative volatility: | | | |
| propylene oxide | 1.00 | 1.00 | 1.00 |
| 2-methyl pentane | 1.3 | — | 0.6 |
| 2-methyl-pentene-1 | 0.8 | 0.5 | — |
| 2-methyl pentene-2 | 0.8 | 0.5 | 0.4 |

The data in Table I show that the effect of the added aromatic hydrocarbon is to lower the volatility of the hydrocarbon impurities in relation to that of propylene oxide. For 2-methyl pentane the volatility relative to propylene oxide is about 1.3 at high concentrations of propylene oxide, but it is not possible to make a complete separation of propylene oxide from 2-methyl pentane by conventional fractionation because of the existence of an azeotrope. As shown by the data in Table I, however, when a sufficient amount of an aromatic hydrocarbon such as ethylbenzene is added, the volatility of 2-methyl pentane relative to propylene oxide is sufficiently reduced that the azeotrope is avoided, and an essentially complete separation of 2-methyl pentane from propylene oxide can be achieved in a fractionation column. Similarly, for the methyl pentenes, the volatility relative to propylene oxide is about 0.8 at high concentrations of propylene oxide, indicating that there is no azeotrope but that complete separation by conventional fractionation would be very difficult. When, however, a sufficient amount of an aromatic hydrocarbon is added, the volatility of the $C_6$ olefins relative to propylene oxide is sufficiently reduced that a complete separation can readily be obtained by fractionation. Similar Othmer still distillations demonstrate that corresponding reductions in the relative volatilities of other contaminating hydrocarbons present in crude propylene oxide take place upon distillation in the presence of aromatic hydrocarbons of the character indicated.

EXAMPLE II

An impure propylene oxide feed containing contaminating hydrocarbons including 2-methyl pentane and $C_6$ olefins such as 2-methyl pentene-1 and 2-methyl-pentene-2 in concentrations totaling less then 1 weight percent as produced by the process described in Example I, is heated and charged near the bottom of a fractional distillation column having about 30 theoretical plates into which ethylbenzene is fed at a point about 10 theoretical plates below the top of the column. The weight ratio of ethylbenzene to propylene oxide feed is about 14. The distillation in the column is effected at superatmospheric pressure such that the vapor temperature is about 90°C. and a reflux equal to about 1.0 times the amount of distillate is maintained. Purified propylene oxide substantially free from the hydrocarbon impurities is withdrawn as overhead product and the bottoms from the distillation unit which comprise ethylbenzene and the contaminating hydrocarbons are removed. The bottoms stream after the hydrocarbon impurities have been separated from it by stripping is then recycled to the distillation column.

EXAMPLE III

Example II is repeated with toluene being substituted for the ethylbenzene as the extractive distillation solvent. Propylene oxide of similar purity is recovered.

Corresponding results are obtained when toluene and ethylbenzene are replaced in the foregoing examples by benzene, o-xylene, cumene, pseudocumene, 3,5-diethyltoluene, n-butylbenzene, m-diisopropylbenzene, p-diethylbenzene, and other mono-cyclic aromatic hydrocarbons having 6 to 12 carbon atoms.

What is claimed is:

1. A process for purifying propylene oxide containing as impurities hydrocarbons having 5 to 7 carbon atoms which comprises extractively distilling said impure propylene oxide with an extractive distillation solvent consisting essentially of a mono-cyclic aromatic hydrocarbon having 6 to 12 carbon atoms and having a melting point below 50°C in an extractive distillation column wherein said propylene oxide is introduced into said extractive distillation column, said aromatic hydrocarbon is introduced into said column as a separate stream at a point higher than the point of introduction of said propylene oxide, purified propylene oxide is removed as a distillate from said extractive distillation column, and said aromatic hydrocarbon enriched in said hydrocarbon impurities is removed as bottoms from said extractive distillation column.

2. A process according to claim 1, wherein the aromatic hydrocarbon is present in a quantity of at least about 1 part by weight per 3 parts by weight of propylene oxide.

3. A process according to claim 1, wherein the aromatic hydrocarbon has from 7 to 8 carbon atoms in the molecule.

4. A process according to claim 1, wherein the extractive distillation is carried out at pressures of from about 3 psia to about 100 psia.

5. A process according to claim 1, wherein the impure propylene oxide is produced by the epoxidation of propylene.

6. A process according to claim 5, wherein the epoxidation is effected by means of an aromatic hydroperoxide.

7. A process according to claim 1, wherein the impure propylene oxide contains propylene derivatives.

8. A process according to claim 1, wherein the aromatic hydrocarbon is ethylbenzene.

9. A process for purifying propylene oxide formed by the epoxidation of propylene and containing paraffinic and olefinic hydrocarbon contaminants having 5 to 7 carbon atoms which comprises extractively distilling the impure propylene oxide with an extractive distillation solvent consisting essentially of a mono-cyclic aromatic hydrocarbon having a melting point below 50°C, in an extractive distillation column by introducing said impure propylene oxide into said column, introducing said aromatic hydrocarbon into said column as a separate stream at a point higher than the point of introduction of said propylene oxide, separating purified propylene oxide as a distillate, and separating said aromatic hydrocarbon enriched in said contaminants as bottoms, said aromatic hydrocarbon being present in the amount of at least about one part by weight per three parts by weight of propylene oxide.

10. A process according to claim 9, wherein the aromatic hydrocarbon is present in the liquid phase in a quantity of from about 1 part by weight to about 20 parts by weight per 1 part by weight of propylene oxide.

11. A process according to claim 9, wherein the aromatic hydrocarbon has from 7 to 8 carbon atoms in the molecule.

12. A process according to claim 9, wherein the impure propylene oxide is obtained by the epoxidation of propylene by means of an aromatic hydroperoxide, contains propylene derivatives having 6 carbon atoms in the molecule, and the extractive distillation is carried out at pressures of from about 3 psia to about 100 psia.

13. In a process wherein propylene is epoxidized by means of an aromatic hydroperoxide to produce propylene oxide contaminated with hydrocarbons which are propylene derivatives having 5 to 7 carbon atoms and the propylene oxide is freed of said propylene derivatives by extractive distillation, the improvement which comprises effecting said distillation in the presence of an extractive distillation solvent consisting essentially of the aromatic hydrocarbon corresponding to the aromatic hydroperoxide used in said epoxidation, by introducing said contaminated propylene oxide into an extractive distillation column, introducing said aromatic hydrocarbon into said column as a separate stream at a point higher than the point of introduction of said propylene oxide, removing purified propylene oxide as a distillate from said extractive distillation column, and removing said aromatic hydrocarbon enriched in said propylene derivatives as bottoms from said extractive distillation column.

14. A process for purifying propylene oxide containing as impurities hydrocarbons having 5 to 7 carbon atoms which comprises extractively distilling said impure propylene oxide with an extractive distillation solvent which is a mono-cyclic aromatic hydrocarbon having 6 to 12 carbon atoms and having a melting point below 50°C, in an extractive distillation column wherein said propylene oxide is introduced into said extractive distillation column, said aromatic hydrocarbon is introduced into said column as a separate stream at a point higher than the point of introduction of said propylene oxide, purified propylene oxide is removed as a distillate from said extractive distillation column and said aromatic hydrocarbon enriched in said hydrocarbon impurities is removed as bottoms from extractive distillation column.

* * * * *